(12) United States Patent
Adams et al.

(10) Patent No.: US 11,100,000 B2
(45) Date of Patent: Aug. 24, 2021

(54) EMBEDDED IMAGE MANAGEMENT

(71) Applicant: Hewlett Packard Enterprise Development LP, Houston, TX (US)

(72) Inventors: Aland B. Adams, Fort Collins, CO (US); Michael S. Bunker, Tomball, TX (US); John Sarni, Andover, MA (US); Gary W. Thome, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/776,424

(22) PCT Filed: Nov. 29, 2015

(86) PCT No.: PCT/US2015/062867
§ 371 (c)(1),
(2) Date: May 16, 2018

(87) PCT Pub. No.: WO2017/091235
PCT Pub. Date: Jun. 1, 2017

(65) Prior Publication Data
US 2018/0341593 A1 Nov. 29, 2018

(51) Int. Cl.
*G06F 12/0875* (2016.01)
*G06F 16/50* (2019.01)
*G06F 11/14* (2006.01)
*G06F 16/00* (2019.01)
(Continued)

(52) U.S. Cl.
CPC ........ *G06F 12/0875* (2013.01); *G06F 9/4401* (2013.01); *G06F 11/14* (2013.01); *G06F 11/1415* (2013.01); *G06F 11/1417* (2013.01); *G06F 16/00* (2019.01); *G06F 16/50* (2019.01); *G06F 11/2094* (2013.01); *G06F 2212/154* (2013.01); *G06F 2212/455* (2013.01)

(58) Field of Classification Search
CPC .................................................. G06F 11/1469
See application file for complete search history.

(56) References Cited

U.S. PATENT DOCUMENTS

| 7,013,385 | B2 | 3/2006 | Abbondanzio |
| 7,350,068 | B2 | 3/2008 | Anderson |
| 8,892,863 | B2 | 11/2014 | Nilakantan |
(Continued)

FOREIGN PATENT DOCUMENTS

JP        2009-193453 A        8/2009

OTHER PUBLICATIONS

VMware. Inc.; "Auto Deploy" Jun. 26, 2015; 8 pages; printed from: <https://www.vmware.com/products/vsphere/features/auto-deploy>.

(Continued)

*Primary Examiner* — Nicholas J Simonetti
(74) *Attorney, Agent, or Firm* — Brooks, Cameron & Huebsch, PLLC

(57) ABSTRACT

In one example, a system for embedded image management includes a blade enclosure that includes a set of server blades, an embedded image management appliance coupled to the blade enclosure, comprising: an image repository stored in a memory resource, an appliance operating system that operates on the memory resource, and an image resource manager that operates on the appliance operating system.

19 Claims, 3 Drawing Sheets

(51) Int. Cl.
   *G06F 9/4401*    (2018.01)
   *G06F 11/20*     (2006.01)

(56) References Cited

U.S. PATENT DOCUMENTS

| | | | |
|---|---|---|---|
| 9,141,419 B1 * | 9/2015 | Yoder et al. ........ | G06F 9/45558 709/217 |
| 2003/0126242 A1 | 7/2003 | Chang | |
| 2004/0054780 A1 | 3/2004 | Romero | |
| 2004/0255110 A1 * | 12/2004 | Zimmer .................... | G06F 8/61 713/2 |
| 2005/0210465 A1 * | 9/2005 | Sasaki ....................... | G06F 8/65 717/175 |
| 2006/0015781 A1 * | 1/2006 | Rothman et al. ... | G06F 11/2028 714/100 |
| 2007/0027973 A1 | 2/2007 | Stein et al. | |
| 2007/0101001 A1 | 5/2007 | Cromer et al. | |
| 2009/0133010 A1 | 5/2009 | Bandholz et al. | |
| 2010/0115077 A1 * | 5/2010 | Tameshige .............. | H04L 41/06 709/223 |
| 2013/0290694 A1 | 10/2013 | Civilini | |
| 2016/0014073 A1 * | 1/2016 | Reddy ..................... | H04L 67/38 713/2 |

OTHER PUBLICATIONS

International Search Report and Written Opinion received for PCT Patent Application No. PCT/US2015/062867, dated Jul. 26, 2016, 11 pages.

International Preliminary Report on Patentability received for PCT Patent Application No. PCT/US2015/062867, dated Jun. 7, 2018, 10 pages.

* cited by examiner

EMBEDDED IMAGE MANAGEMENT

BACKGROUND

Computing systems can utilize hardware, instructions, or logic to execute a set of workloads. In some examples, the computing system can include a set of blade servers within a blade enclosure to execute the set of workloads. The set of blade servers can utilize a set of server images that act as a duplicate copy of data within the set of blade servers. In some examples, the set of server images can be utilized to restore data to the set of blade servers.

DETAILED DESCRIPTION

A set of examples for embedded image management are described herein. In one example, a system for embedded image management includes a blade enclosure that includes a set of server blades, an embedded image management appliance coupled to the blade enclosure, comprising: an image repository stored in a memory resource, an appliance operating system that operates on the memory resource, and an image resource manager that operates on the appliance operating system.

Embedded image management as described herein can include utilizing physical hardware within a server blade enclosure. As used herein, the server blade enclosure can include a device that stores and utilizes a plurality of server blades. As used herein, the server blades can each include a set of computing devices that provide a set of functions. The embedded image management can utilize a set of image management appliances that can be physically embedded within the server blade enclosure. The set of image management appliances can include a memory resource separate from server blades within the server blade enclosure that can be utilized to store a set of server images or a set of server boot volumes for servers that are within the server blade enclosure.

In some examples, the image management appliances can be coupled to other image management appliances that are embedded in other server blade enclosures. In some examples, each of the image management appliances can be part of an image management architecture. The image management architecture can enable management of a plurality of server images and subsets of server images across a blade enclosure that includes a plurality of server blades. By utilizing the image management appliances with corresponding memory resources, the embedded image management systems described herein, can provide boot volumes that are separate from the server blades and allow for repairing and replacing server blades more efficiently compared to previous systems. Previous systems can utilize storage area networks or storage arrays that are remote from the blade enclosure. These previous systems can include a relatively higher cost and can be more error prone to configure compared to the embedded image management systems described herein.

Figure 1:
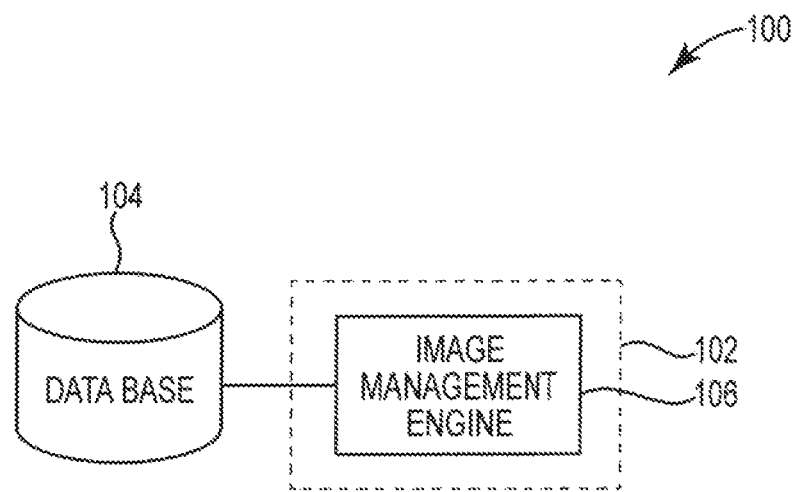
FIG. 1 illustrates a diagram of an example system for embedded image management consistent with the present disclosure.
Figure 2:
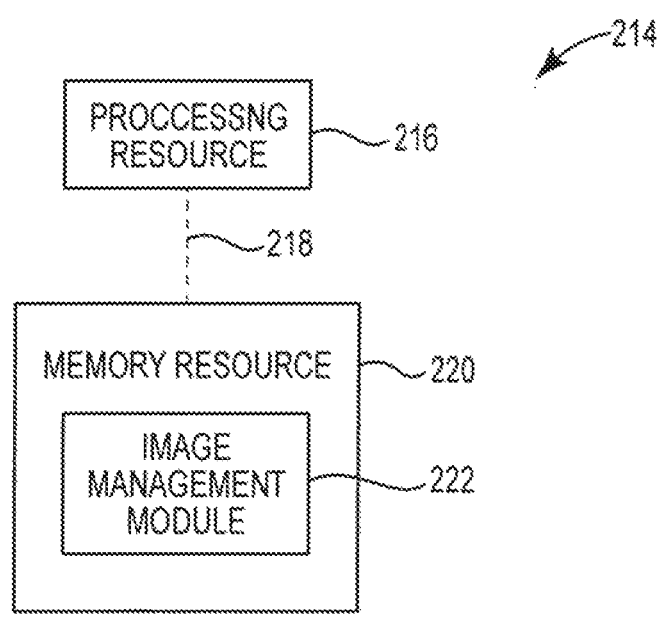
FIG. 2 illustrates a diagram of an example computing device for embedded image management consistent with the present disclosure.

FIGS. 1 and 2 respectively illustrate an example system 100 and an example computing device 214 consistent with the present disclosure. FIG. 1 illustrates a diagram of an example system 100 for embedded image management consistent with the present disclosure. The system 100 can include a database 104, an image management system 102, or a set of engines (e.g., image management engine 106). The image management system 102 can be in communication with the database 104 via a communication link, and can include the set of engines (e.g., image management engine 106). The image management system 102 can include additional or fewer engines than are illustrated to perform the various functions as will be described in further detail in connection with FIGS. 3-4.

The set of engines (e.g., image management engine 106) can include a combination of hardware and programming, but at least hardware, that can perform functions described herein (e.g., provide stateless remote storage for stateless server blades of a set of server blades, execute a server image to restore data to the set of servers within a blade enclosure, deploy a server image to a server blade, copy server images, add server images, delete server images, send server image copies to a image management appliance, etc.) stored in a memory resource (e.g., computer readable medium, machine readable medium, etc.) as well as hard-wired program (e.g., logic).

The image management engine 106 can include hardware or a combination of hardware and programming, but at least hardware, to store and manage a plurality of server images for a plurality of computing devices. As used herein the plurality of server images can include a disk image of data within a corresponding computing device such as a server blade. In some examples, the server images can be generated by creating a sector-by-sector copy of a memory resource of the corresponding computing device. The server images can be in a set of different formats and can utilize a set of different image operating system types. As used herein, the image operating system is an operating system within the server image that is utilized for a boot operation of a computing device. In some examples, the image operating system will be the operating system for the computing device when the computing device is operational. For example, the image operating system can be a Windows® operating system. In this example, the Windows® operating system can be utilized by the computing device when the server image is utilized to boot the computing device.

In some examples, the image management engine 106 can include hardware or a combination of hardware and programming, but at least hardware, to add, delete, modify, update, or display a plurality of server images that are stored in an image repository. In some examples, the image management engine 106 can be utilized to copy a set of server images that are considered to be a master server image. In some examples the set of copied server images can be transferred from a first image repository to a second image repository. As described further herein, the image management engine 106 can be utilized for generating an image repository architecture.

In some examples, the image management engine 106 can be utilized to deploy the set of server images stored within a memory resource. For example, the image management engine 106 can receive requests for a particular server image to be deployed to a particular server blade within a blade enclosure. In some examples, a deployed server image to a server blade can replace data stored on the server blade to a previous set of stored data. For example, a server blade can include corrupted data stored data. In this example, the image management engine 106 can deploy a corresponding server image for the server blade to restore data on the server blade without the corrupted data.

FIG. 2 illustrates a diagram of an example computing device 214 consistent with the present disclosure. The computing device 214 can utilize software, hardware, firmware, or logic to perform functions described herein.

The computing device 214 can be any combination of hardware and program instructions configured to share information. The hardware, for example, can include a processing resource 216 or a memory resource 220 (e.g., computer-readable medium (CRM), machine readable medium (MRM), database, etc.). A processing resource 216, as used herein, can include any set of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a function (e.g., provide stateless remote storage for stateless server blades of a set of server blades, execute a server image to restore data to the set of servers within a blade enclosure, etc.).

The memory resource 220 can be in communication with a processing resource 216. A memory resource 220, as used herein, can include any set of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a communication link 218 can include an electronic bus internal to a machine (e.g., a computing device) where the memory resource 220 is one of volatile, non-volatile, fixed, or removable storage medium in communication with the processing resource 216 via the electronic bus.

A set of modules (e.g., image management module 222) can include CRI that when executed by the processing resource 216 can perform functions. The set of modules (e.g., image management module 222) can be sub-modules of other modules. For example, the image management module 222 and another module can be sub-modules or contained within the same computing device. In another example, the set of modules (e.g., image management module 222) can comprise individual modules at separate and distinct locations (e.g., CRM, etc.).

As used herein, a set of modules (e.g., image management module 222) can include instructions that when executed by the processing resource 216 can function as a corresponding engine as described herein. For example, the image management module 222 can include instructions that when executed by the processing resource 216 can function as the image management engine 106.

Figure 3:
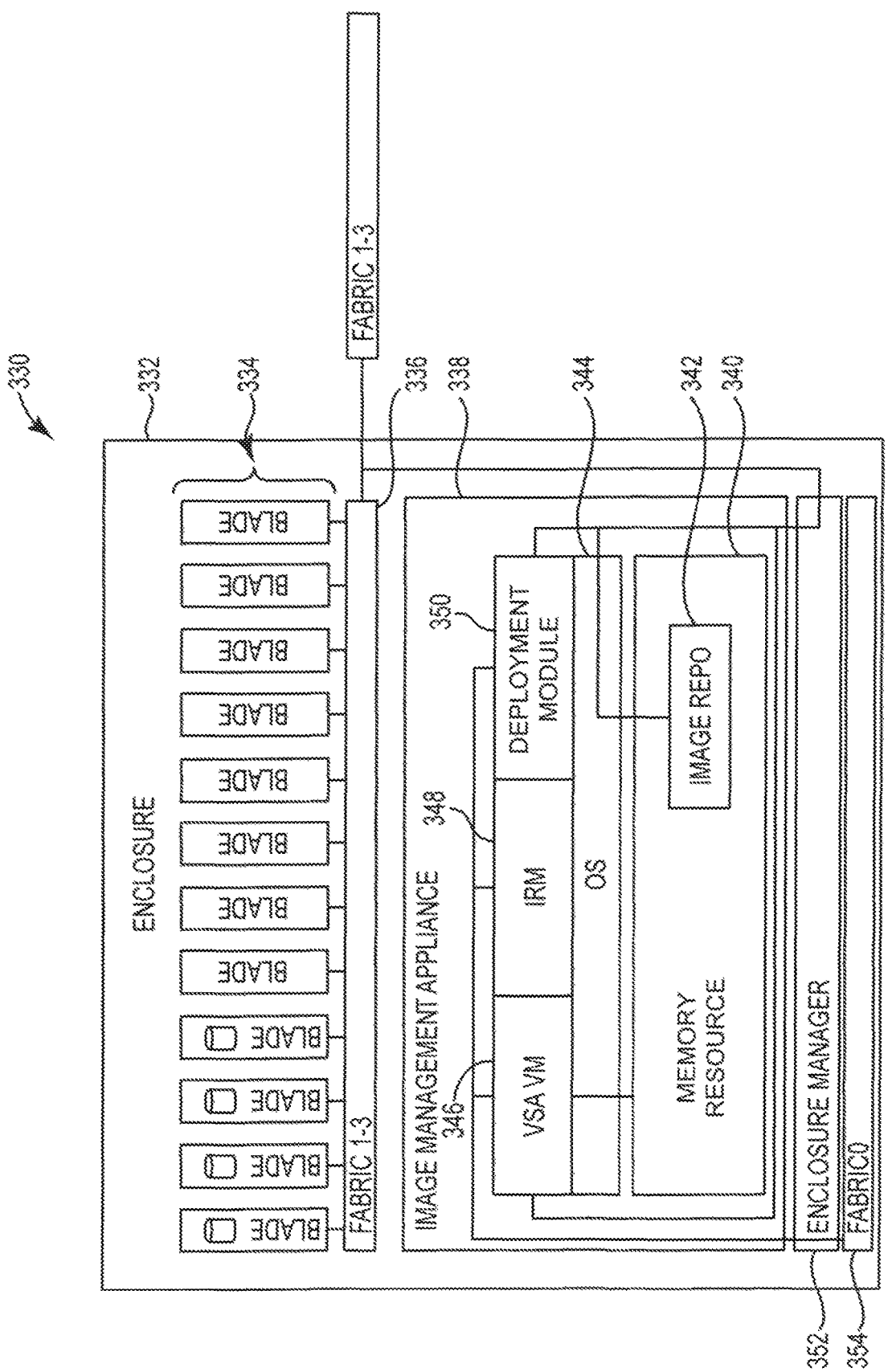
FIG. 3 illustrates a diagram of an example system for embedded image management consistent with the present disclosure.

FIG. 3 illustrates a diagram of an example system 330 for embedded image management consistent with the present disclosure. The system 330 can include a server blade enclosure 332. The server blade enclosure can be a server rack that can receive and utilize a set of server blades 334. In some examples, each of the set of server blades 334 can include a set of computing devices as described herein to provide a set of functions. The set of server blades 334 can be coupled to the server blade enclosure 332 (e.g., connected to electrical power, connected to networks, physically connected to the server blade enclosure 332, connected to other server blades 334 within the server blade enclosure 332, etc.).

The set of server blades 334 can be coupled to an enclosure manager 352 via a fabric connection 336. As used herein, the fabric connection 336 can include a set of communication lines (e.g., Ethernet, fiber optics, etc.) or switches that connect the set of server blades 334 to the enclosure manager 352. The enclosure manager 352 can be a computing device that can manage operation of the set of server blades 334. For example, the enclosure manager 352 can manage resource allocation, power allocation, or virtual machine allocation of the set of server blades 334. In some examples, the enclosure manager 352 can be utilized to execute a set of functions of the image management appliance 338. In some examples, the enclosure manager 352 can be coupled to the image management appliance 338. In some examples, the enclosure manager 352 can be coupled to a fabric connection 354. In some examples, the fabric connection 354 can be utilized to physically connect a number of computing devices to the enclosure manager 352.

The image management appliance 338 can include a physical enclosure (e.g., image management appliance enclosure) that includes a memory resource 340 that can be utilized to store a set of server images within an image repository 342. In some examples, the memory resource 340 can be physically separate from the memory resources of the set of server blades 334. The image repository 342 can be utilized as part of an image management architecture as described further herein with reference to FIG. 4. For example, the image repository 342 can be a system repository that includes a number golden server images of the set of server blades 334. In another example, the image repository 342 can be a master repository that includes a set of copies of the golden server images. In some examples, the image repository 342 can be managed by the image management appliance 338 or managed by a different image management appliance as described herein. As used herein, a golden server image can be a template for a computing device such as a server. The golden server image can include a data that can be utilized to restore or boot up a computing device such as a server. In some examples, the golden image can be utilized to make a set of master copies that can be distributed to a set of master repositories as described herein.

In some examples, the image management appliance 338 can utilize an appliance operating system (OS) 344. The appliance operating system 344 can be a particular OS type (e.g., Windows®, Linux®, etc.). In some examples, the appliance OS 344 can be the same or different operating system as an image OS for each of the set of server images stored in the image repository 342. As described herein, the appliance OS 344 can be the same or different as the utilized by the set of server blades 334. In some examples, the image OS can correspond to an OS utilized by the set of server blades 334. In some examples, the image OS can be utilized to boot the set of server blades 334, In these examples, the image OS can replace an existing OS of the set of server blades 334.

In some examples, the appliance OS 344 can be utilized to execute a virtual storage appliance (VSA) 346. In some examples, the VSA 346 can be a VSA virtual machine (VM) that is executed on the appliance OS 344 via the image management appliance 338. In some examples, the VSA 346 can provide stateless remote storage for the image management appliance 338 in addition to the physical memory resource 340. In some examples, the VSA 346 can perform a redundant array of independent disks (RAID) storage with a corresponding image management appliance located within the server blade enclosure 332. In some examples, a VSA within the corresponding image management appliance can be utilized to perform RAID storage with the VSA 346 of the image management appliance 338. In some examples, a first image management appliance can be utilized as a primary image management appliance and a second image management appliance can be used as a backup image management appliance with a RAID copy from the primary image management appliance.

In some examples, the appliance OS 344 can be utilized to execute an image repository manager (IRM) 348. The IRM 348 can be utilized to manage the image repository 342 stored in the memory resource 340. In some examples, the IRM 348 can also be utilized to manage image repositories of a set of other image management appliances coupled to the image management appliance 338. For example, the IRM 348 can be utilized to add server images to the image repository 342, remove server images from the image repository 342, update or modify server images within the image repository 342, or display a plurality of server images within the image repository 342.

In some examples, the appliance OS 344 can be utilized to execute a deployment module 350. In some examples, the deployment module 350 can be executed by the OS 344 to deploy a set of server images to a particular server blade from the set of server blades 334. As used herein, deploying a server image to a server blade includes restoring a server from the set of server blades 334 to a previous stored point that is represented by the server image. In some examples, the image management appliance 338 can utilize the set of server images stored within the image repository 342 to restore a set of the server blades 334 to a save point represented by the set of server images.

The image management appliance 338 can provide additional embedded storage for the server blade enclosure 332 and provide an embedded image repository 342 that can be managed internally by the server blade enclosure 332 compared to previous methods and systems that utilize storage area networks or storage arrays to manage server images. In some examples, the image management appliance 338 can utilize the memory resource 340 to store set of blade boot volumes that can be utilized to boot a set of the server blades 334. In addition, each of a plurality of blade enclosures (e.g., server blade enclosure 332, etc.) can include an embedded image management appliance 338 that can work with other embedded image management appliances to manage an image repository architecture.

Figure 4:
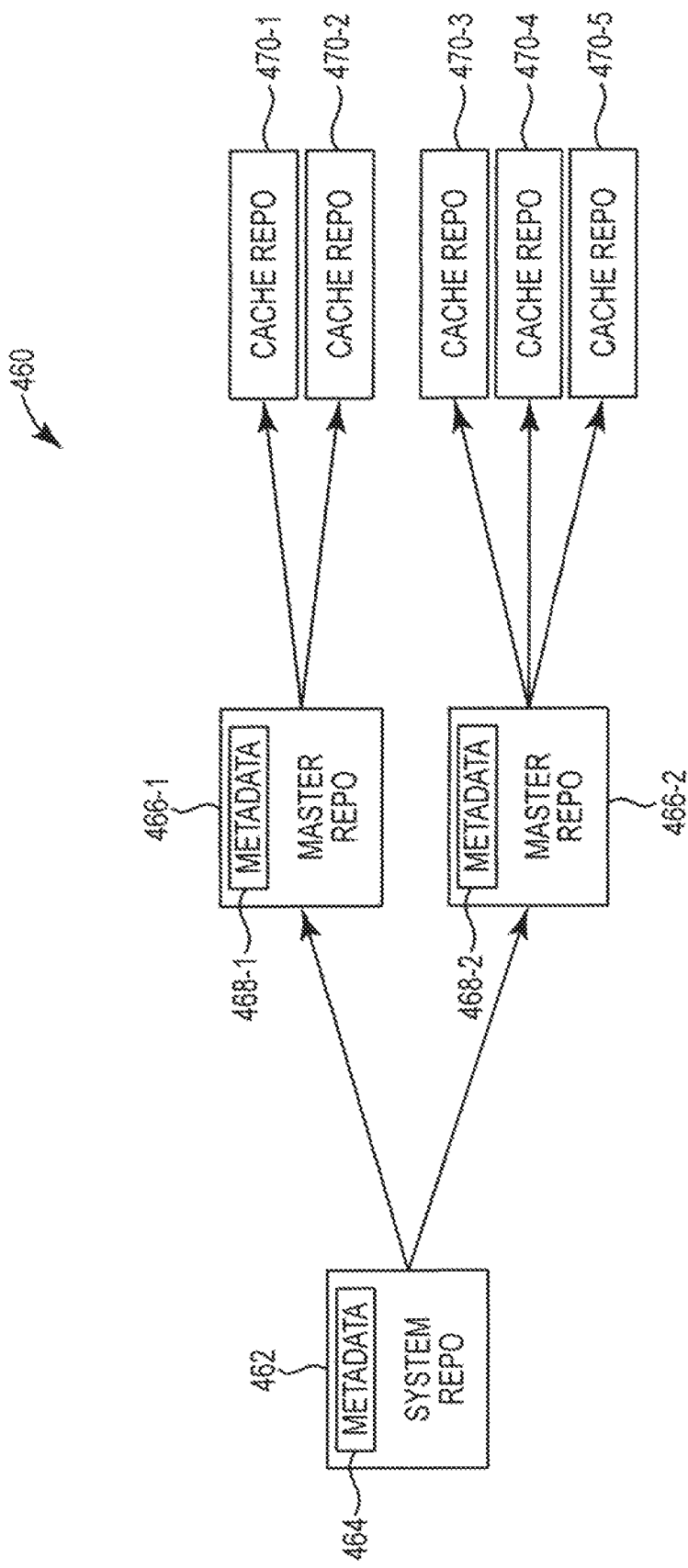
FIG. 4 illustrates a diagram of an example system for embedded image management consistent with the present disclosure.

FIG. 4 illustrates a diagram of an example system 460 for embedded image management consistent with the present disclosure. In some examples, the system 460 can represent an image repository architecture. As described herein, the system 460 can include a plurality of embedded image management appliances that work together to provide the image repository architecture. In some examples, each of the plurality of embedded image management appliances can include an image repository.

In some examples, the system 460 can utilize a set of management levels for the image repository architecture. For example, the set of management levels can include repositories such as a system repository, a master repository, or a cache repository. Each of the set of management levels can provide a set of designated functionality. For example, the system 460 can include a set of embedded image management appliances that utilize a system repository 462. In some examples, the system repository 462 can include a set of master server images or a set of golden server images for a set of server blades within a set of blade enclosures. As described herein, each of the set of server images can include a corresponding image operating system that can be utilized to boot one or more server blades.

In some examples, the system repository 462 can include metadata 464 that defines a relationship between the system repository 462, the master repositories 466-1, 466-2, or the cache repositories 470-1, 470-2, 470-3, 470-4, 470-5. For example, the metadata 464 can define a type of server images that are stored within a corresponding image management appliance. The type of server images can include, but are not limited to: golden images, master images, or cache images. In some examples, the golden images can represent an original state. That is, the golden images can represent default server images that can be utilized to restore a server blade to manufacturer settings. In some examples, the golden images may be default server images that are not altered.

In some examples, the system repository 462 can be utilized to add new golden server images, delete existing golden server images, generate master server images, or deploy a set of server images. In some examples, the metadata 464 can be utilized to define a functionality of the system repository 462. For example, the metadata 464 can define how golden images can be altered, how golden images can be copied, how golden images are organized, or how golden images are displayed on a user interface. In some examples, the metadata 464 can include limitations on altering or deleting the golden images.

In some example, the system repository 462 can store a set of golden server images that can be copied to generate a set of master images that can be stored in a master repository 466-1, 466-2. In some examples, a golden server image stored in the system repository 462 can be copied by an embedded image management appliance that includes the system repository 462. The copied golden server image can be sent to a set of master repositories 466-1, 466-2 as master server images. The master server images can be stored and managed by embedded image management appliances corresponding to the master repositories 466-1, 466-2.

The master repositories 466-1, 466-2 can include metadata 468-1, 468-2 that can define a functionality of the master repositories 466-1, 466-2. For example, the metadata 468-1, 468-2 can define management functionality for the master repositories 466-1, 466-2. In some examples, the metadata 468-1, 468-2 can define a type of server images that are stored within the master repositories 466-1, 466-2. In some examples, the metadata 468-1, 468-2 can define that server images corresponding to a particular image OS that are stored within a particular master repository 466-1, 466-2. For example, the metadata 468-1 can define that server images that utilize a Windows® image OS are to be stored within the master repository 466-1. In another example, the metadata 468-2 can define that server images that utilize a Linux® image OS are to be stored within the master repository 466-2.

In some examples, the metadata 468-1, 468-2 can be utilized to define how master server images are shared or deployed. For example, the metadata 468-1, 468-2 can be utilized to define a set of server blades where the master server images can be utilized. In this example, the master server images can correspond to a particular image OS or server blades with particular hardware features (e.g., processing capabilities, memory resources, etc.).

In some examples, the metadata 468-1, 468-2 can define a set of embedded image management appliances that can be utilized as cache repositories 470-1, 470-2, 470-3, 470-4, 470-5. For example, the metadata 468-1 within the master repository 466-1 can indicate that copies of a set of master server images can be sent to cache repository 470-1 or cache repository 470-2. In another example, the metadata 468-2 within the master repository 466-2 can indicate that copies of a set of master images can be sent to cache repository 470-3, cache repository 470-4, or cache repository 470-5.

In some examples, the cache repositories 470-1, 470-2, 470-3, 470-4, 470-5 can be utilized to store and deploy cache server images that are received from the master repositories 466-1, 466-2. As described herein, each of the cache repositories 470-1, 470-2, 470-3, 470-4, 470-5 can be within a corresponding embedded image management appliance that are each embedded within a corresponding server blade enclosure as described herein.

In some examples, the cache repositories 470-1, 470-2, 470-3, 470-4, 470-5 can utilize limited functionality compared to the system repository 462 or the master repositories 466-1, 466-2. For example, the cache repositories 470-1, 470-2, 470-3, 470-4, 470-5 may be able to receive updated cache server images from the master repositories 466-1, 466-2, but the cache repositories 470-1, 470-2, 470-3, 470-4, 470-5 may not be able to add new server images, delete server images, or edit cache server images stored within the cache repositories 470-1, 470-2, 470-3, 470-4, 470-5.

The system 460 can be utilized to manage server images across a plurality of server blade enclosures when utilizing embedded image management appliances that are located within each of the plurality of server blade enclosures. As described herein, each of the embedded image management appliances can include storage that is separate from the set of server blades within the server blade enclosure to provide off site storage for the server blade enclosure. In addition, each of the embedded image management appliances can include an appliance OS that can be utilized to provide the image resource management of system 460.

As used herein, "logic" is an alternative or additional processing resource to perform a particular action or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a set of" something can refer to one or more such things. For example, "a set of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for embedded image management, comprising:
   a blade enclosure that includes a plurality of server blades and a memory resource;
   an embedded image management appliance included in the blade enclosure, the embedded image management appliance comprising:
      an image repository stored in the memory resource included in the blade enclosure, the image repository to store server images for server blades of the plurality of server blades, the server images comprising a first server image and a second server image, wherein the first server image comprises a first type of operating system, and the second server image comprises a second type of operating system different from the first type of operating system;
      an image repository manager to add the server images to the image repository; and
      deployment instructions to deploy the server images onto respective server blades of the plurality of server blades, the deployment of the server images comprising deploying the first server image comprising the first type of operating system onto a first server blade of the plurality of server blades, and deploying the second server image comprising the second type of operating system onto a second server blade of the plurality of server blades, wherein the deployment instructions are to manage the deployment of the first and second server images comprising the first and second types of operating systems, respectively, internally in the blade enclosure.

2. The system of claim 1, wherein the image repository manager is to modify a server image of the server images in the image repository.

3. The system of claim 1, wherein the deployment of the first server image onto the first server blade is to cause restoration of the first server blade to a previous point.

4. The system of claim 1, wherein the embedded image management appliance further comprises an appliance operating system to execute the image repository manager and the deployment instructions.

5. The system of claim 4, wherein the appliance operating system is separate from operating systems of the plurality of server blades.

6. The system of claim 1, comprising a fabric to couple each of the plurality of server blades to the embedded image management appliance.

7. The system of claim 1, wherein the memory resource is separate from memory resources of the plurality of server blades.

8. The system of claim 1, wherein the deployment of the first and second server images comprising the first and second types of operating systems, respectively, are performed without use of a storage area network or storage array that is remote from the blade enclosure.

9. The system of claim 1, wherein the image repository of the embedded image management appliance comprises a cache repository to store the server images copied from a master repository.

10. The system of claim 9, wherein the embedded image management appliance is a first embedded image management appliance to interact with a second embedded image management appliance included in another blade enclosure to copy the server images from the master repository in the second embedded image management appliance to the cache repository in the first embedded image management appliance.

11. A non-transitory machine-readable storage medium comprising instructions of an image management appliance embedded in a blade enclosure, the instructions upon execution causing a system to:
  add a plurality of server images to an image repository stored in a memory resource within the blade enclosure comprising a plurality of servers, wherein the plurality of server images comprise a first server image and a second server image, the first server image comprising a first type of operating system, and the second server image comprising a second type of operating system different from the first type of operating system; and
  deploy the plurality of server images onto respective servers of the plurality of servers, wherein the deployment of the plurality of server images comprises deploying the first server image comprising the first type of operating system onto a first server of the plurality of servers, and deploying the second server image comprising the second type of operating system onto a second server of the plurality of servers, wherein the instructions are to manage the deployment of the first and second server images comprising the first and second types of operating systems, respectively, internally in the blade enclosure.

12. The non-transitory machine-readable storage medium of claim 11, wherein the image management appliance is physically embedded within the blade enclosure.

13. The non-transitory machine-readable storage medium of claim 11, wherein the image management appliance is embedded on at least one of the plurality of servers.

14. The non-transitory machine-readable storage medium of claim 11, wherein the deployment of the first server image onto the first server is to cause restoration of the first server to a previous point.

15. The non-transitory machine-readable storage medium of claim 11, wherein the image repository in the blade enclosure comprises a cache repository storing the plurality of server images copied from a master repository.

16. The non-transitory machine-readable storage medium of claim 15, wherein the image management appliance is a first image management appliance to interact with a second image management appliance included in another blade enclosure to copy the plurality of server images from the master repository in the second image management appliance to the cache repository in the first image management appliance.

17. A system for embedded image management, comprising:
  a first image management appliance that includes a system embedded image repository to store a plurality of system server images;
  a blade enclosure comprising a plurality of servers; and
  a second image management appliance embedded within the blade enclosure and that includes a master embedded image repository to store a plurality of master server images, the plurality of master server images comprising copies of a portion of the plurality of system server images from the system embedded image repository, wherein the second image management appliance is coupled to the first image management appliance, the master embedded image repository is stored in a memory resource in the blade enclosure, and the second image management appliance is executable in the blade enclosure to:
    add the plurality of master server images to the master embedded image repository, wherein the plurality of master server images comprise a first server image and a second server image, the first server image comprising a first type of operating system, and the second server image comprising a second type of operating system different from the first type of operating system, and
    deploy the plurality of master server images onto respective servers of the plurality of servers, wherein the deploying of the plurality of master server images comprises deploying the first server image comprising the first type of operating system onto a first server of the plurality of servers, and deploying the second server image comprising the second type of operating system onto a second server of the plurality of servers.

18. The system of claim 17, comprising a third image management appliance that includes a cache embedded image repository to store cache copies of a portion of the plurality of master server images from the second image management appliance, wherein the third image management appliance is coupled to the second image management appliance and embedded within a different blade enclosure.

19. The system of claim 17, wherein the first image management appliance and the second image management appliance include metadata to define a relationship between the first image management appliance and the second image management appliance.

* * * * *